United States Patent [19]

Tesch et al.

[11] 4,220,137
[45] Sep. 2, 1980

[54] SOLAR ENERGY COLLECTING SYSTEM

[76] Inventors: Allen R. Tesch, 823 Lake Amy Belle; Scott T. Tesch, both of 823 Lake Amy Belle, Hubertus, Wis. 53033

[21] Appl. No.: 943,238

[22] Filed: Sep. 18, 1978

[51] Int. Cl.³ .............................................. F24J 3/02
[52] U.S. Cl. .................................. 126/425; 126/439; 350/299
[58] Field of Search ............... 126/270, 271, 419, 424, 126/425, 438, 439, 440, 441; 237/1 A; 350/292, 299

[56] References Cited

U.S. PATENT DOCUMENTS

| 2,595,905 | 5/1952 | Telkes | 126/270 |
| 2,857,634 | 10/1958 | Garbade et al. | 126/270 X |
| 2,918,709 | 12/1959 | Corcoran | 126/270 X |
| 3,012,294 | 12/1961 | Waldor | 126/270 X |
| 3,704,683 | 12/1972 | Summersby | 350/299 |
| 4,002,159 | 1/1977 | Angilletta | 237/1 A X |
| 4,023,555 | 5/1977 | Bailey | 126/424 |
| 4,057,048 | 11/1977 | Maine | 126/271 |
| 4,090,497 | 5/1978 | Kelly | 237/1 A X |
| 4,130,109 | 12/1978 | Brucek | 126/439 |

FOREIGN PATENT DOCUMENTS 7706870 3/1977 France ..................................... 126/438

Primary Examiner—Samuel Scott
Assistant Examiner—Randall L. Green

[57] ABSTRACT

The solar energy collecting system of the preferred embodiment of the present invention includes two sets of louvers, adapted for being mounted in a window opening. A first set of louvers is mounted vertically, each louver having a pivot point at its top and its bottom. This set of louvers is controlled for reflecting infra-red rays of the sun toward the inside of the building in which the system is installed. The second set of louvers is mounted horizontally and usually interiorly of the first set. The horizontal louvers also include pivot points at their ends and a control system is provided for reflecting and focusing the rays reaching their surfaces to an energy collector. Various features of the present invention which are described herein include constructing one or both sets of louvers from insulating material so that the louvers can be closed to reduce heat loss from the structure, placing the energy collector either inside or outside of the structure or having collectors both on the inside and on the outside to permit a choice of where the rays are focused, various operating modes for the dual-louver system, and various shapes which can be employed for the louvers.

17 Claims, 11 Drawing Figures

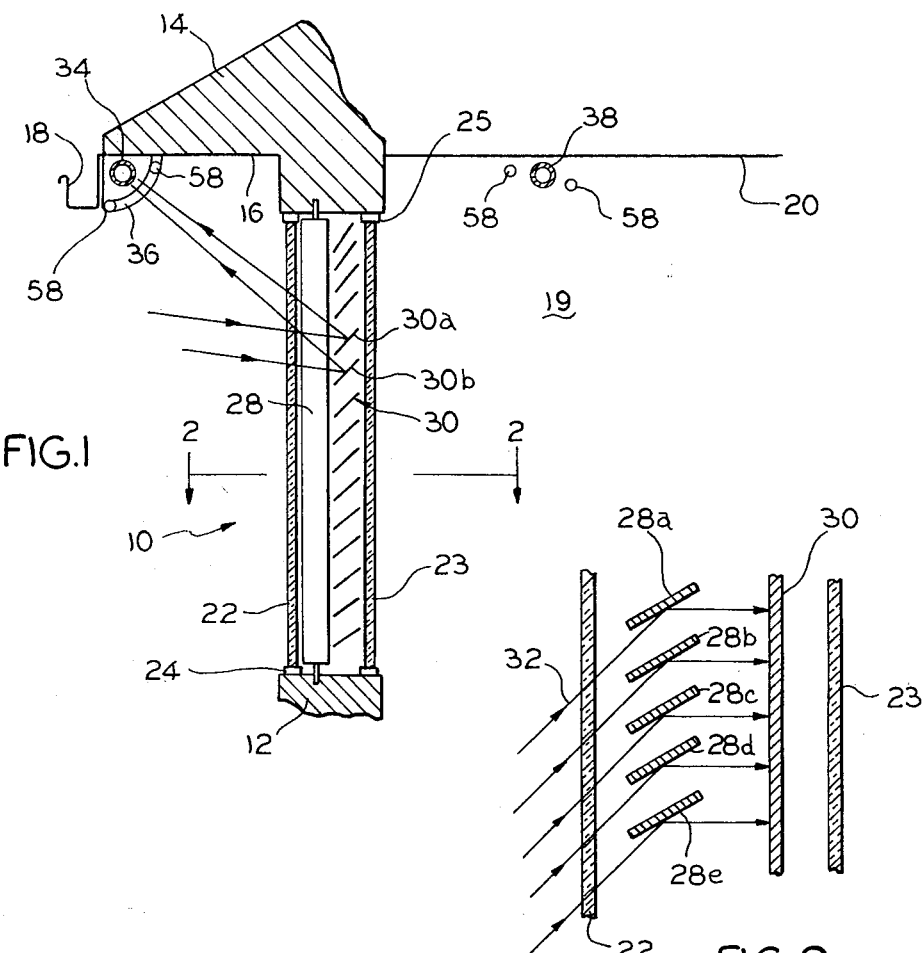
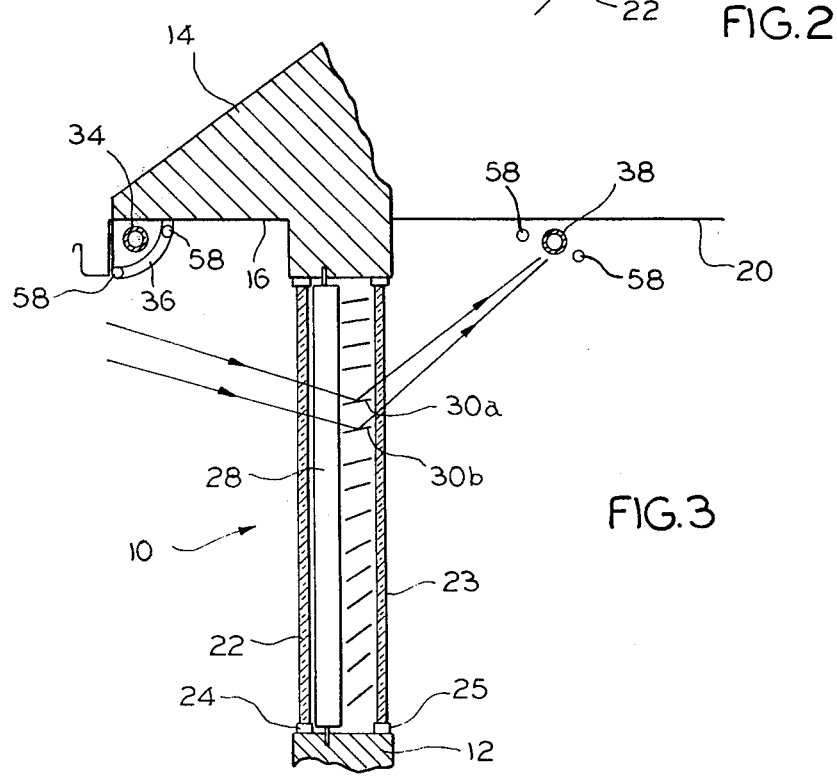

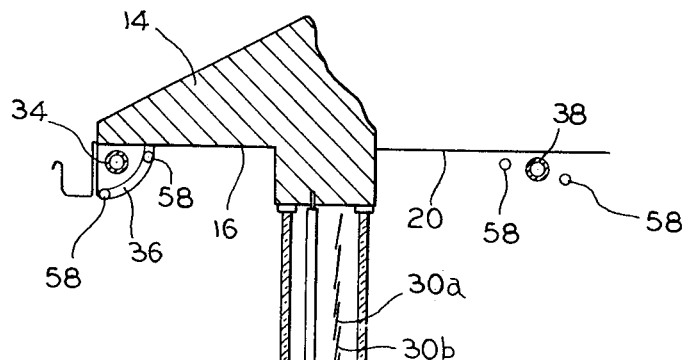
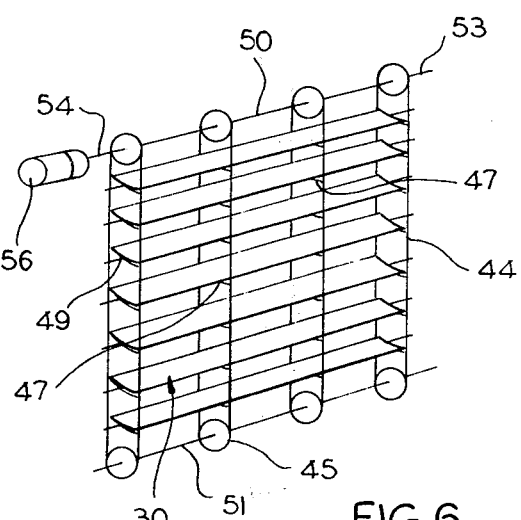
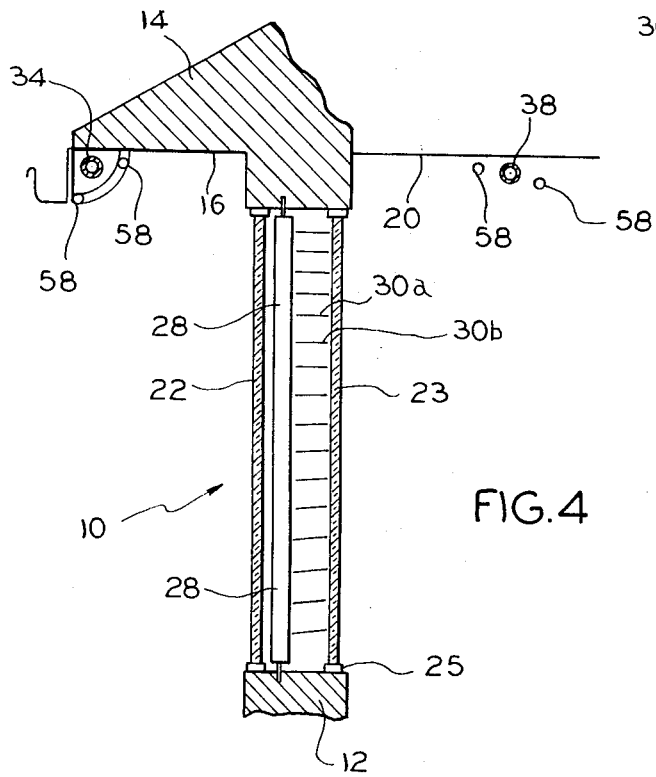

SOLAR ENERGY COLLECTING SYSTEM

FIELD OF THE INVENTION

The present invention relates generally to the art of solar energy collecting systems, and in particular to such systems which use sun-tracking louvers for focusing infra-red radiation onto an energy collector.

BACKGROUND OF THE INVENTION

Many different types of systems are known for converting the energy available in sunlight to usable energy, and the energy shortage of the 1970's is fostering the development of new and more efficient systems. The basic principal is quite simple, i.e. concentrate the sun's infra-red radiation by focusing the radiation onto an energy collector. While the concept might be simple, the development of the use of solar energy has been hampered by numerous problems including the size of the units, cost-efficiency, convertibility of existing systems, aesthetics, material availability, etc.

The most common type of solar collector now in use includes a frame which supports a housing containing a sheet of metal attached to a piping arrangement, the latter in turn being covered by multiple layers of glass. Many problems are encountered with such systems. The hardware is bulky and accordingly, such systems require a large amount of space and reduce the aesthetic value of the property. Because the units are typically located outside of buildings, the units cool down to outside temperatures at night and require long start-up times during the following day. Moreover, these types of units usually have a 1:1 solar pick-up to collector ratio, and therefore, are inefficient.

Additional problems with these fixed solar collectors include problems relating to construction, e.g. due to large differences in internal temperatures, cracking of the glass and seals results and special chemicals have to be used in chilly climates to prevent freeze-up of the water passing through the collectors.

It is also very difficult to add the presently available systems to existing buildings. Solar collector panels must be mounted in large numbers upon the roof of the building or on adjoining property. Still another disadvantage is that the systems perform no function during cloudy periods or at night. But probably the most important problem with such systems is that they are efficient only when the sun reaches one particular location relative to the collectors.

Some known systems do include sun-tracking features. For example, in Wartes' U.S. Pat. No. 3,884,217 issued Sept. 20, 1972 for "Method and Apparatus for Collecting Solar Energy" a system is described which includes a plurality of flat, elongated reflector units. The reflectors are arranged so that the beams of light are reflected therefrom to an energy collector. The individual units are rotated about their horizontal axes as the elevation of the sun changes, thereby maintaining a convergence of the reflected rays. The unit described in this patent also includes a drive unit for rotating all of the reflectors about the axis of the collector so that the reflectors always receive light at an angle normal to their axes. This equipment is quite bulky and does not overcome all of the aforementioned disadvantages.

Another type of system which has been developed includes a plurality of fixed lenses and means for moving an absorber so that it always remains at the focal point of the lenses. The aforementioned disadvantages are also inherent in this system design.

The development of a solar energy collecting system which overcomes these disadvantages would be a significant advance in this technology.

OBJECTS OF THE INVENTION

It is a primary object of the present invention to provide a solar energy collecting system which overcomes the aforementioned disadvantages of the prior art.

Another object of the present invention is to provide a solar energy collecting system which can be utilized in new or existing structures and which can be installed in a window opening to provide energy collecting and window viewing.

Yet another object of the present invention is to provide a solar energy collecting system which requires no floor space and which will not decrease the aesthetic value of buildings.

Still another object of the present invention is to provide a solar energy collecting system which includes an improved system for tracking sun position without the need for moving a bulky frame.

Another object of the present invention is to provide a solar energy collecting system which has the capability of focusing the sun's rays on a collector located outside a building in the summer or inside the building in the winter.

Another object of the present invention is to provide a solar energy collecting system which requires no special glazing or insulation.

A further object of the present invention is to provide a solar energy collecting system which replaces window coverings such as shades, venetian blinds, curtains or drapes, thereby offsetting the initial cost of the energy system.

Yet another object of the present invention is to provide a solar energy collecting system which may be used to reduce heat loss from structures.

A still further object of the present invention is to provide a solar energy collecting system which includes louvers and novel control means for focusing the sun's rays reflected from the louvers to an energy collector and for automatically changing from one mode of operation to alternate modes of operation depending on the time of day or the amount of sunlight available.

How these and other objects of the present invention are accomplished will be described in the following specification taken in conjunction with the FIGURES. Generally, however, the objects are accomplished by providing a solar energy collecting system which includes at least one set of parallel louvers and control means for moving the louvers depending on the operating function desired. In the preferred embodiment of the present invention, the louvers are designed to be inserted into a window opening so that the louvers replace normal window coverings, such as drapes, curtains, venetian blinds and the like. Preferably two sets of louvers are mounted between a pair of parallel glass plates. The outermost set of louvers is mounted vertically, means being provided for controlling the angular orientation of the louvers from fully opened to fully closed positions. When the louvers are fully closed, solar rays impinging thereon from the outside is reflected away from the structure and an air space is created between the louvers and the outermost glass panel to provide an insulation layer to reduce heat or cooling loss from the structure. When the first set of louvers is opened, the louvers reflect sunlight interiorly and the control means generally directs sunlight inwardly at an angle that is perpendicular to the glass panes. This control system therefore, permits tracking for azimuthal changes in the sun position. It should also be noted that the outside louvers can be fully opened to permit escape of heat rays from the structure, for example, as might be desired on a warm summer evening. The second set of louvers is mounted inside of the first set, the inside louver members being mounted horizontally. Control means are also provided for these louvers for moving them from fully opened to fully closed positions. These louvers are adapted for catching the light rays reflected inwardly from the first set of louvers and directing them to an energy collector, for example, a pipe through which water is circulated. These louvers are controlled so that the individual louver members track the sun to maintain the reflected light on the collector and thereby compensate for sun elevation. As is the case with the first set of louvers, these louvers can be closed to form an additional air space or they can be opened completely to permit heat rays to leave or enter the structure. The present invention also provides a high degree of flexibility in the location of the collector. For example, the collector can be placed outside the structure for use during warm weather or it can be placed inside the building (or even between the sets of louvers) for cold weather use. Various materials for constructing the louvers are described in the specification, the preferred materials and shapes being those which improve the heat reflecting and insulation properties of the louvers. Several embodiments for the control system are also described.

DESCRIPTIONS OF THE FIGURES

FIG. 1 is a cross-section showing one preferred form of the present invention, the energy collector being used on the outside of a building;

FIG. 2 is a partial section taken along the line 2—2 of FIG. 1;

FIG. 3 is a cross-section similar to FIG. 1 but showing the energy collector being used inside a building;

FIG. 4 is a cross-section similar to FIG. 1, except showing the louvers of the present invention in an operating mode which permits heat loss from a building;

FIG. 5 is a cross-section similar to FIG. 1, except showing the louvers of the present invention arranged for providing insulation to prevent heat or cooling loss from a building;

FIG. 6 is a perspective view illustrating one form of louver support and control system according to one form of the invention;

DESCRIPTION OF THE PREFERRED EMBODIMENT

Figure 7:
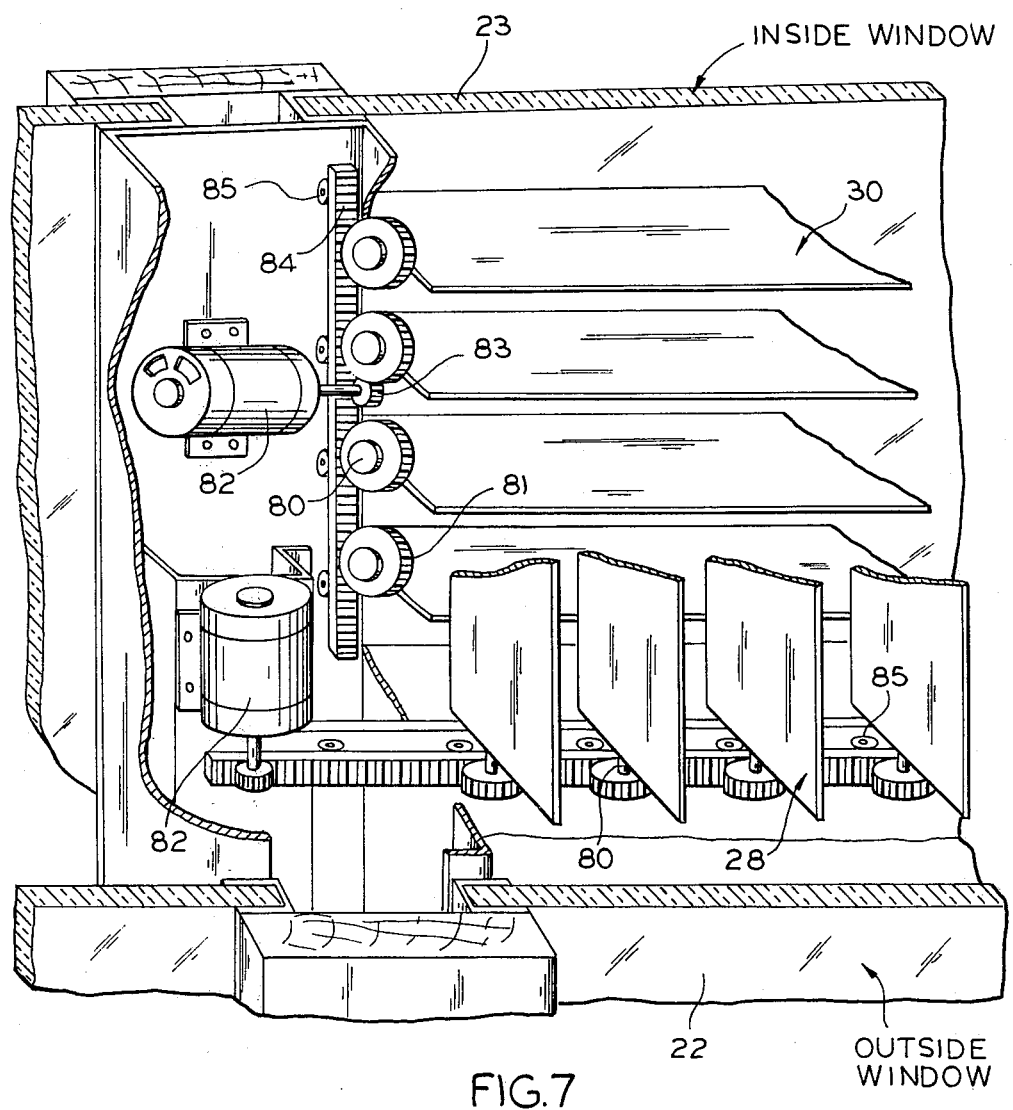
FIG. 7 is a perspective view of an alternate form of louver support and control system.

The preferred embodiments of the present invention will now be described by reference to the eleven FIGURES, like reference numerals being used throughout. For the basic description, reference should be had to FIGS. 1-5, these FIGURES illustrating the same embodiment of the invention in different operating modes and different views.

Referring now to FIG. 1, a solar energy collecting system 10 is used for a building which includes a side wall 12, a roof 14 and eaves 16. The lower edge of roof 14 is laterally displaced from the side wall 12. A gutter 18 is also shown in this FIGURE mounted to the lower edge of roof 14. FIGS. 1 and 3 also show the building to include a room 19 inside of wall 12, the room 19 having a ceiling 20 and, of course, other walls and a floor (not shown).

In this embodiment, solar energy collecting system 10 is adapted for use as part of a window opening and is, therefore, adaptable for use in existing houses, buildings or in new construction. As a result, system 10 includes a pair of parallel and spaced apart glass panes 22 and 23, which in turn are mounted in a window opening by top and bottom frame members 24 and 25. The side support frames are not shown. Panes 22 and 23 should be transparent to infra-red and visible radiation. Not shown in the FIGURES are the glazing components for the glass, but it should be understood that an air space is provided between panes 22 and 23, and, therefore, the panes function like a conventional double glazed storm window. It should also be recognized, however, that system 10 may be used with other types of window systems such as double-hung, casement, etc. and that system 10 can include screen members for permitting fresh air to enter the building and for permitting hot air to escape from the building.

The primary components of the solar energy collecting system 10 are two sets of louvers 28 and 30 which are mounted between panes 22 and 23. For purposes of this description, individual louvers will be identified as 28a, 28b, 28c, etc. for the louvers of set 28 and 30a, 30b, 30c, etc. for the louvers of set 30. Only certain of the individual louvers will be specifically referred to so the small reference letters are not meant to be limiting with respect to louver position, angle, etc.

Louvers 28 are mounted parallel to and just inside pane 22 and are mounted vertically with respect to the building. Louvers 30 are mounted parallel to pane 23 and are located between louvers 28 and pane 23, however, louvers 30 are mounted horizontally. Each individual louver is pivotable about its axes and may be moved for purposes advantageous to the objects of the present invention. It is also appropriate to point out at this time that the louvers are spaced from one another by a distance which will permit sets 28 and 30 to be fully closed if a high degree of insulation is required when system is not in use. In other words, each of the louvers of set 28 may be adjusted to a position whereby the widest dimensions of the louvers are parallel to pane 22. Similarly, each of the louvers of set 30 can also be moved so that the widest dimensions thereof face pane 23. The louvers can be oversized in width to permit overlapping to insure a tight seal. The materials used for louvers 28 and 30, the preferred shapes thereof and the mechanism by which the louvers' position is set and controlled will be more fully described in a later section of this specification.

Returning to FIG. 1 and FIG. 2, the function of the louver sets 28 and 30 can now be described. Louvers 28 are for reflecting infra-red radiation from the sun toward the inside of room 19, preferably in a line which is perpendicular to panes 22 and 23. It wil be appreciated that solar rays normally would enter the room at an angle and depending on the orientation of the unit 10 with respect to the path of the travel of the sun, and the angle at which the sun moves through the sky, each of louvers 28 will be moved at the proper angle for reflecting solar rays toward room 19 as can be seen in FIG. 2. It will also be apparent that the angle will vary from day to day as the path of the sun changes. For maximum effectiveness, the louvers should also be as close as possible to pane 22 for reflecting the maximum amount of solar heat possible. FIG. 2 shows the operation of five particular louvers 28a-28e in reflecting solar rays 32 toward the louver set 30.

The function of the second set of louvers 30 can best be appreciated by reference to FIGS. 1 and 3. These louvers are individually aligned for reflecting the sunlight which reaches their surfaces to an energy collector and, as was true of louvers 28, louvers 30 must also compensate for movement of the sun. As seen in FIGS. 1-3, louvers 30 are each set at a different angle. However, rather than correcting for azimuth position of the sun, these louvers compensate for zenith movement of the sun and insure that the solar rays remains focused at the desired location.

The collector shown in FIG. 1 comprises a pipe 34 mounted outside of the room 19, below roof 14 and behind the gutter 18. Pipe 34 is preferably about as long as horizontal louvers 30 and means (not shown) are provided for passing water or some other suitable fluid through pipe 34 for collecting heat therefrom. For example, pipe 34 could be connected to a pump (not shown) and other pipes could be provided for moving the fluid to means for storing and utilizing the heat generated by system 10. The details of the heat collector system are not provided here because in and of itself it forms no part of the present invention. However, by way of illustration, pipe 34 can be a copper pipe. It can also be noted in FIG. 1 that the collector pipe 34 is surrounded by a glass shield 36 which is provided primarily to protect collector 34 from the weather. The glass shield 36 also serves to insulate collector 34 if the exterior collector is used during winter operation of system 10. If the exterior collector 34 is used during warm weather, the glass shield 36 need not be used because insulation is not required.

However, the present invention, in its preferred form, includes a separate collector 38 for use in winter months. Collector 38 is mounted on the ceiling 20 of room 19 at a location which permits heat rays to be reflected thereupon, such as is shown in FIG. 3. A glass covering is not required because heat losses are to the structure itself and there is no need to protect the collector 38 from evening cool-down. The fluid supply, pumps and heat storage systems for collector 38 may be the same as those employed for collector 34, suitable valving being provided for permitting a switch-over from one collector system to the other. The advantages of the dual collector system become apparent when it is understood that the heat rays focused on the collectors heat the collectors and, naturally, the surrounding environment. The use of an exterior collector in the summer will avoid creation of undesirable heat in room 19, while the use of an interior collector during the winter months will result in heat being generated not only to the collector but to the room also.

The solar energy collector system 10 illustrated in FIGS. 1-3 may also be used for several other operating functions. For example, as illustrated in FIG. 5, the louvers may each be placed in their closed position which will create three air spaces 40, 41 and 42 between the two glass panes 22 and 23. In addition to the insulation provided in this operating mode of system 10, the heat reflective interior louvers 30 will reflect the inside heat rays, preventing them from reaching the outside.

Alternately, and as shown in FIG. 4, during hot weather both the vertical louvers 28 and the horizontal louvers 30 may be placed in their fully opened positions to allow heat rays from inside the building to radiate to the outside. Again it should be mentioned that a screen may be provided either in lieu of or in addition to panes 22 and/or 23, the panes being openable to permit fresh air to enter room 19 or heat to escape from room 19, as desired.

Yet another operating mode can be carried out using system 10. In this embodiment, the first set of louvers 28 operates as was described in connction with FIGS. 1-3, but the second set of louvers is adjusted to reflect solar rays to a second predetermined location in room 19 when sunlight is available and the room needs to be heated. The predetermined location could be the floor, a wall area or a heat sink located in the room.

Still, a further operating mode which differs only slightly from the foregoing would provide means for closing only the outside set of louvers 28 when, for example, during a partly cloudy day the intensity of impinging sunlight is insufficient to create the desired heat. In this mode, an air insulation space is created between pane 22 and louvers 28, even though the focused positions of louvers 30 are not affected. When sufficient sunlight again becomes available, the ouside set of louvers 28 is opened to the correct position.

Dealing next with the louver control means of the present invention, one form of such control for horizontal louvers 30 is illustrated in FIG. 6. The control system includes a plurality of endless loops 44 for supporting louvers 30, the loops 44 each being held in place by a pair of wheels 45 located in the top and bottom frames of system 10. The loops 44 define a plane which is perpendicular to panes 22 and 23 and include a plurality of support strap members 47, preferably flexible supports, between their respective sides. Louvers 30 in turn rest on the support members 47 so that they are held horizontally in position. A sufficient number of loops 44 should be provided to insure sufficient support for louvers 30 and prevent sagging thereof.

It can also be seen in FIG. 6 that a pair of rods 50 and 51 are provided for supporting and turning wheels 45. The rods are parallel to one another, rod 51 being mounted in the bottom of the window frame for free rotation. Each of the bottom wheels 45 is securely affixed to rod 51 so that movement of the rod will cause simultaneous rotation of all of the wheels. To insure that rod rotation results in uniform movement of the louvers, a non-slip material or coating is preferably added to the periphery of the wheels 45 or to the inside of loops 44, or to both.

The upper rod 50 includes a first end 53 which is supported for free rotation in the upper window frame but the other end 54 of rod 50 is coupled to a motor 56 which is adapted for controlled rotation of rod 50 in either direction about its axis. As was the case with rod 51, the upper wheels 45 are affixed to rod 50 (preferably with a non-slip covering) and the loops 44 pass over the aligned wheels and are held taught therebetween.

From the FIGURES, especially FIGS. 1 and 3 it can be seen that the angle of individual louvers 30 varies from the uppermost louver to the bottom louvers and the spacing between the louvers also increase from the top to the bottom louvers. Because the solar rays reach the inside set of louvers at a common angle and because the inside set of louvers 30 reflects the heat rays to a common and relatively small area, the louvers 30 will have to be individually focused to the collector in order to achieve maximum temperatures.

In the illustrated embodiment each of the louvers is initially set between the sides of loops 44 by properly affixing the two ends of support members 47 at a proper angle with respect to one another. The angle will vary for each support member 47 as indicated in the preceding paragraph. When the louvers 30 are placed in the loops on supports 47, all of the louvers will be rotated about their axes in the same direction when rods 50 and 51 are rotated. During the sun's movement, louvers 30 will rotate axially to maintain their specular reflection to the line of concentration at the collector. As is also apparent from FIGS. 1 and 3, different initial louver alignments are required when collector 34 is being utilized from those where collector 38 is being used. It should also be mentioned here that instead of the bottom wheels 45 and rod 51, a weighted bar can be used to permit the entire set of louvers 30 to be raised out of the way when not in use, similar to a venetian blind.

As indicated previously, the motor 56 is designed for rotating rod 51 to maintain the correct louver position and has the capability of rotation in both directions to accomodate the various operating modes envisioned by the present invention. Motor 56 is preferably an electromechanical motor which acts in response to a signal which in turn is generated by manual or automatic sensors, a variety of types of which may be used in the present invention.

One example of a suitable sensor is a combination solar intensity sensor and timer. Other examples are temperature sensors, manual controls, and twenty-four hour indexing timers. A description will be provided for the solar intensity sensor system, it being understood that the other systems could be readily adapted by one skilled in the art.

The intensity sensor system consists of a pair of photocells 58 located on either side of collector 34 (or 38) adapted to act as limit switches for controlling louvers 30. When light is focused on either of the cells, the sensor system would react to activate motor 56 to cause the focused solar rays to shift in the proper direction, i.e. back onto collector 34 (or 38). Instead of the photocells 58, temperature sensitive sensors on either side of collector 34 could perform the same function. Another pair of photocells (not shown) located at the ends of collector 34 would control louvers 28 in the same manner.

Photocells (not shown) unassociated with the collectors can also be employed as part of the louver control system for moving the louvers to various other operating positions. For example, a photocell located adjacent the window opening could sense when insufficient light is being received. For example, at night or on cloudy days, or even when the sun passes behind a cloud during an otherwise sunny period, such a photocell activates the motor 56 to place the louvers in the insulation mode shown in FIG. 5, the heat release mode shown in FIG. 4 or in any of the other positions described herein. A far more simple type of louver control would comprise a simple timer adapted for rotating the louvers at a constant speed or indexing them during the period of the day when sunlight impinges on system 10. Of course, such a timer sould have to be adjusted periodically to compensate for changes in sun position and the period of daylight.

While the preciously described form of support and control for adapting this system to existing windows is illustrated as resembling a venetian blind arrangement other types of controls may also be used. For example and as shown in FIG. 7 each of louvers 30 and 28 may be mounted in a rigid frame. Pins 80 which are provided at both ends of the louvers are received in parallel and aligned holes on opposite sides of the frame and each pin is fixed to a gear 81 inside the frame. Motors 82 in the embodiment would be coupled to one louver gear directly or by using a gear 83. The gears of all the louvers would be coupled by a gear rack 84 allowing all louvers to change their position by motor 82 when called for. A belt and pulley arrangement could also be used. Louvers 30 in this embodiment, or in any of the others just described, could be mounted under tension to aid in maintaining the intergrity of the louvers. The frame embodiment also provides an additional advantage in that the frame can be slanted or swing toward the inside of room 19 for cleaning. Of course, to do this pane 23 would have to be made part of the frame, or would have to be removed prior to louver cleaning. The embodiment shown in FIG. 7 also permit the use of the same motor containing chamber for adjacent sets of window louvers.

Motor 82 and its associated louver control means could also be coupled to the sun sensing photocells referred to earlier for totally opening or totally closing louvers 28 for the operating modes previously described. For example, during periods when sunlight is insufficient to utilize the energy collecting mode of FIGS. 1-3, the insulation, heat radiation or other modes can be employed.

The final components of the solar energy collecting system 10 to be described are the louvers themselves, which as shown in FIGS. 8a, 8b, 8c and 8d may take a number of forms. These FIGURES are all cross sections of various louvers which are preferred for use in the present invention. All louvers are preferably constructed of metal or plastic with a speculative reflective surface and the desired structure strength.

Louvers 28 which reflect the solar rays towards the louvers 30 could be coated or laminated with a light-filtering material to minimize light reflection into room 19 if this condition would be undesirable. This coating would not be required on louvers 30 because the location of their focal line is at the collector 38. Louvers 30 could be a highly polished material such as bright aluminum.

Another feature of the present invention permits louvers to be constructed from materials which are transparent to visable light while being reflective to infra-red radiation. This type of material is commonly laminated to glass windows and also used as window shades to reflect heat away from buildings.

The size of the louvers is limited, only to where they will be used (height, width, and depth of window area). Of course, the single strength louvers 92 of FIG. 8a can be flat rather than curved, but the curved form permits greater concentration of solar rays to a fixed line and increases the bending strength of the louvers.

Figures 8A, 8B, 8C, 8D:
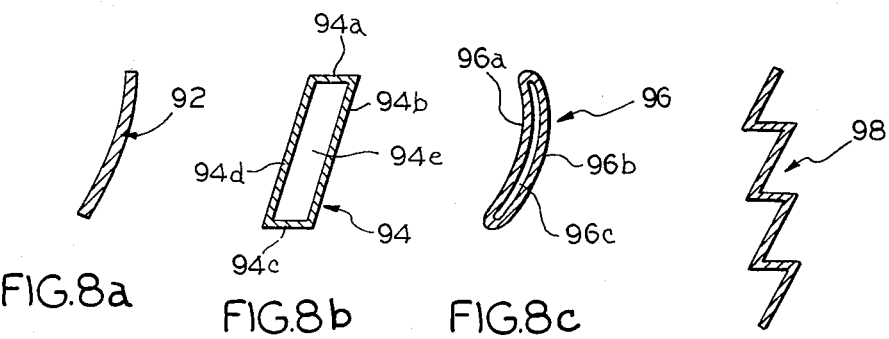
FIGS. 8a-8d are cross-sections of louvers usable in the present invention including curved, flat-insulating, curved-insulating reflectors and continuous, respectively.

FIG. 8b illustrates a second preferred form for louvers 28 and/or 30. This form is the insulating flat louver 94 which is generally trapezoidal in cross section. Louver 94 has 4 sides 94a, b, c, and d, a hollow center 94e and ends (not shown). As with louver 92, louver 94 should have the desired solar reflecting properties and may also be transparent to visible radiation.

This second form of louver is especially beneficial for use in systems where maximum insulation is required during periods when sunlight is not present, and it will be appreciated that the air within louver 94 creates an insulating air space while the trapezoidal shape allows each louver to form an effective seal between the louvers and pane 22. It should also be appreciated that louvers 94 can be formed of solid materials such as expanded polystyrene with a suitable infra-red reflective coating.

A third form of louver is shown in FIG. 8c, this form 96 being curved in cross-section and including curved inner and outer surface 96a and b respectively and hollow center 96c. Louver 96 may be formed by extrusion or other suitable manufacturing techniques and should have sealed ends (not shown) for creating an insulating dead air space within the louver. This form of louver may also be constructed of a solid piece of insulating material (with suitable solar reflecting coatings), transparent materials to provide viewing through unit 10 or from other materials known to the art. The double strength louvers of FIGS. 8b and 8c also provide an increased bending strength as well as the more obvious insulation valves because of the overlapping ability. Other louver shapes may be used in the present invention, and the present invention is not meant to be limited by the illustrated preferred louvers 92, 94 and 96.

FIG. 8d illustrates another preferred form for louvers 30. This form 98 would be molded or formed such that the louvers would be permanently shaped into a zig-zag shape sheet and have a common focal line for all formed louvers. These louvers can not rotate to compensate for changes in the suns elevation, therefor the collector would have to be larger or it would have to move to stay on the focal line. This single sheet of louvers could easily be placed between two sheets of glass thus forming a double insulated window which would be less than 1½ inch thick. Also this sheet could replace one pane of glass.

The solar energy collecting system 10 of the present invention offers many advantages which can be briefly summarized. System 10 can be utilized in windows of new or existing rooms and still permit sunlight to enter the room. The system is mounted in a permanently located frame so frame rotation for tracking the sun is not necessary. The system can be used for focusing radiation alternately to collectors located inside or outside of the building and the system neither decreases usable space in the building nor diminishes the aesthetic value of the structure.

Other important advantages include the elimination of multiple collectors (the present system requiring only a single collector pipe through which a suitable gas or liquid is forced), no special glazing is required, cleaning is minimized and easy, window coverings can be eliminated, room heating as well as collector heating can be carried out, the components of the system do not require any special insulation and at the same time the system itself can provide extremely beneficial insulation properties to the structure.

Accordingly, the objects of this invention are accomplished by providing a system which not only efficiently captures usable infra-red radiation from the sun, but does so utilizing equipment which is relatively simple to construct, relatively inexpensive to manufacture and which provides so many additional advantages that the cost of initial installation is further reduced. The energy collecting system of the present invention has a very long useful life and is not subject to the weathering problems so common with other systems known to the art.

While the present invention has been described in connection with the illustrated preferred embodiments, those skilled in the art to which this invention is directed would be able to construct other embodiments incorporating the louver principle of the invention. For example, for some embodiments it may be possible to eliminate louvers 28, e.g. where the building in which the system is to be used has rooms large enough to house large or very long collectors. The efficiency and cost of such a modification is not however as practical as the double louver system described above. Moreover, while the louvers have been illustrated as being pivotable about their axes, movement about an edge is also within the scope of the invention. Yet other modifications in the provision of a collector which converts solar energy directly into electrical energy. Accordingly, the invention is not to be limited to the illustrated embodiment but is to limited solely by the claims which follow.

We claim:

1. A solar energy collecting system comprising two sets of solar ray reflective louvers installed in a window opening of a building, a first set of said louvers being mounted vertically and the second set of said louvers being mounted horizontally, a solar energy collector located generally adjacent but spaced apart from said window opening, control means for moving said louvers to compensate for changes in sun position and resulting changes in the incident angle at which solar rays impinge upon said louvers, one set of said louvers being arranged and controlled by said control means for reflecting incident solar rays to said other set of louvers, and said other set of louvers being arranged and controlled by said control means for reflecting and focusing solar rays reflected thereon to said solar energy collector.

2. The invention set forth in claim 1 wherein said collector is located exteriorly of said building.

3. The invention set forth in claim 1 wherein said collector is located interiorly of said building.

4. The invention set forth in claim 1 wherein a collector is located exteriorly of said building and another collector is located interiorly of said building, said control means being adapted for selectively reflecting solar rays to one or the other of said collectors.

5. The invention set forth in claim 1 wherein said vertically mounted louvers reflect light to said horizontally mounted louvers, said vertical louvers being mounted exteriorly of said horizontal louvers in said window opening.

6. The invention set forth in claim 1 wherin said louvers are mounted intermediate a pair of parallel and spaced apart glass panes, said panes being transparent to visible and solar heat radiation.

7. The invention set forth in claim 1 further including means for fully closing said louvers.

8. The invention set forth in claim 1 wherein at least one set of louvers is comprised of curved louvers.

9. The invention set forth in claim 1 wherein at least one set of said louvers is constructed of heat insulating material whereby when said louvers are fully closed, the insulation of said window opening is improved.

10. The invention set forth in claim 1 wherein said louvers are transparent to visible radiation.

11. A solar energy collecting system comprising:

a first set of louvers mounted vertically, each of said louvers being pivotable about its axis and a first control means being provided for said first set of louvers for uniformly pivoting individual louver members from fully opened to fully closed positions and for tracking sun position;

a second set of louvers mounted generally adjacent to said first set of louvers, said second set of louvers being mounted horizontally;

said first set of louvers being arranged for reflecting solar rays toward said second set of louvers;

an elongate solar energy collector located generally adjacent to and parallel to said second set of louvers;

each of said second louvers being arranged for reflectin solar rays from said first louvers toward said energy collector; and second control means for said second set of louvers to uniformly rotate same about their axis to track sun position and maintain the solar rays reflected therefrom focused on said collector.

12. The invention set forth in claim 11 wherein said two sets of louvers are mounted in a window opening of a building.

13. The invention set forth in claim 11 wherein said control means include motor means for rotating said louvers about their axis.

14. The invention set forth in claim 13 wherein said control means further includes solar ray sensor means coupled to said motor means for insuring that said first louvers reflect solar rays toward said second set of louvers and that solar rays reflected from said second set of louvers remain focused on said collector regardless of sun position.

15. The invention set forth in either of claims 11 or 14 wherein said control means is adapted for fully opening and fully closing at least one set of said louvers.

16. The invention set forth in claim 13 wherein each of said louver means includes gear means, said gear means being coupled to a rack gear means provided for each of said first and second set of louvers and said motor means being coupled to said rack gear means for sliding same and rotating said louvers about their axes.

17. A solar energy collecting system comprising a plurality of elongate, generally parallel louvers installed in a window opening of a building, each of said louvers having a solar ray reflective surface, a pair of elongate solar energy collectors spaced apart from said window opening and offset therefrom, whereby said collectors are generally parallel to each of said louvers but do not intersect any line which is perpendicular to the surface defined by said window opening, one of said collectors being located exteriorly of said building and the other of said collectors being located interiorly of said building, control means for moving said louvers to compensate for changes in sun position and resulting changes in the incident angle at which solar rays impinge upon said louvers, said louvers being arranged for focusing said solar rays onto one or the other of said collectors, and whereby said system includes a control means being adapted for selectively reflecting solar rays to one or the other of said collectors.

* * * * *